2 Sheets--Sheet 2.
W. P. HALE.
Sawing-Machine.
No. 160,899
Patented March 16, 1875.
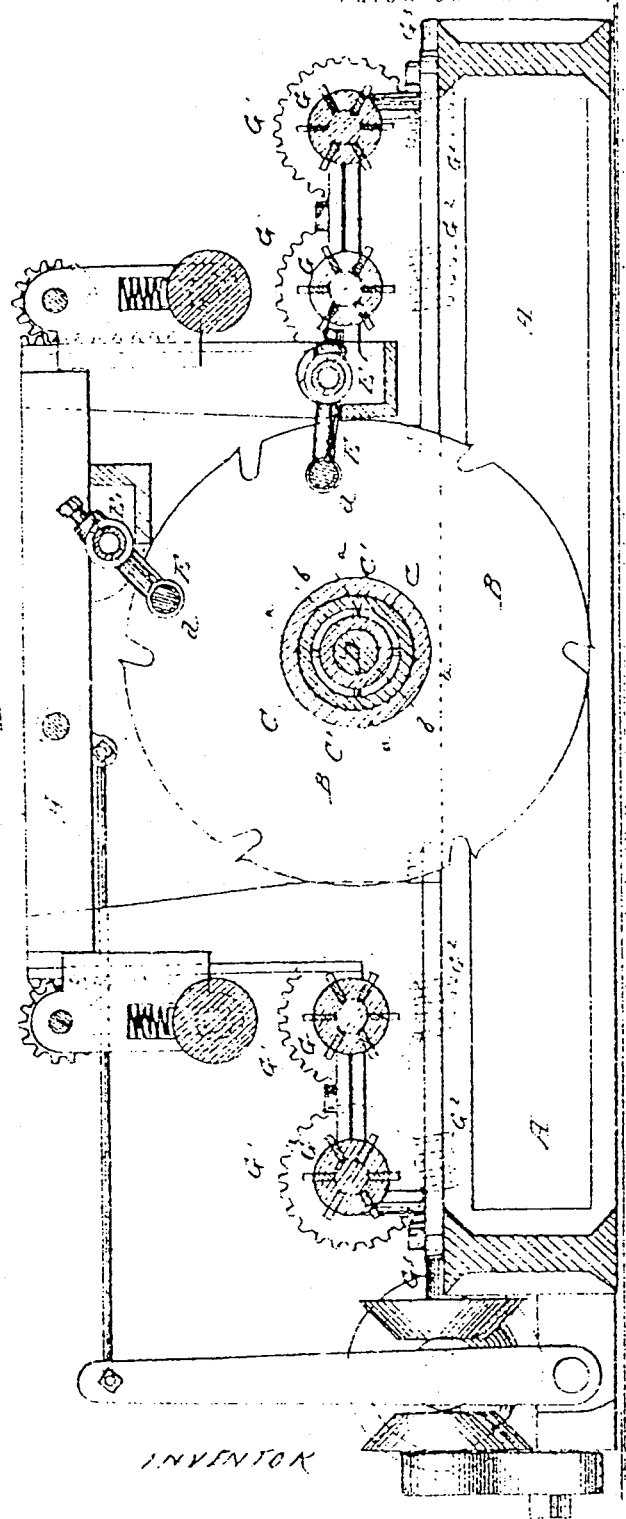
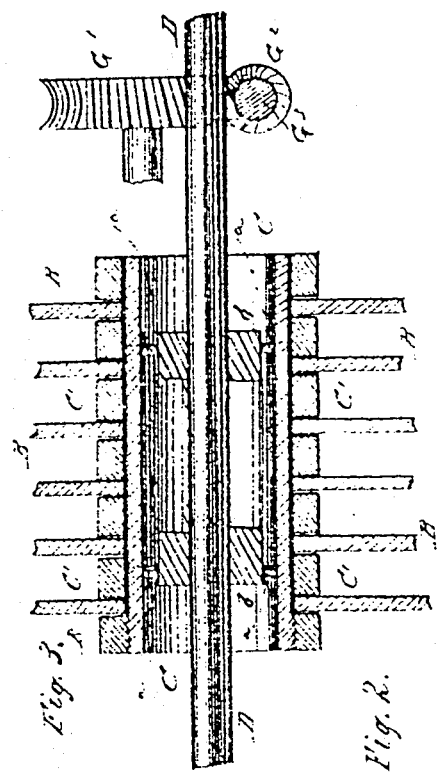
WITNESSES.
P C Dietrich
J P Baker
INVENTOR
Wm P Hale
T H Alexander
ATTORNEY

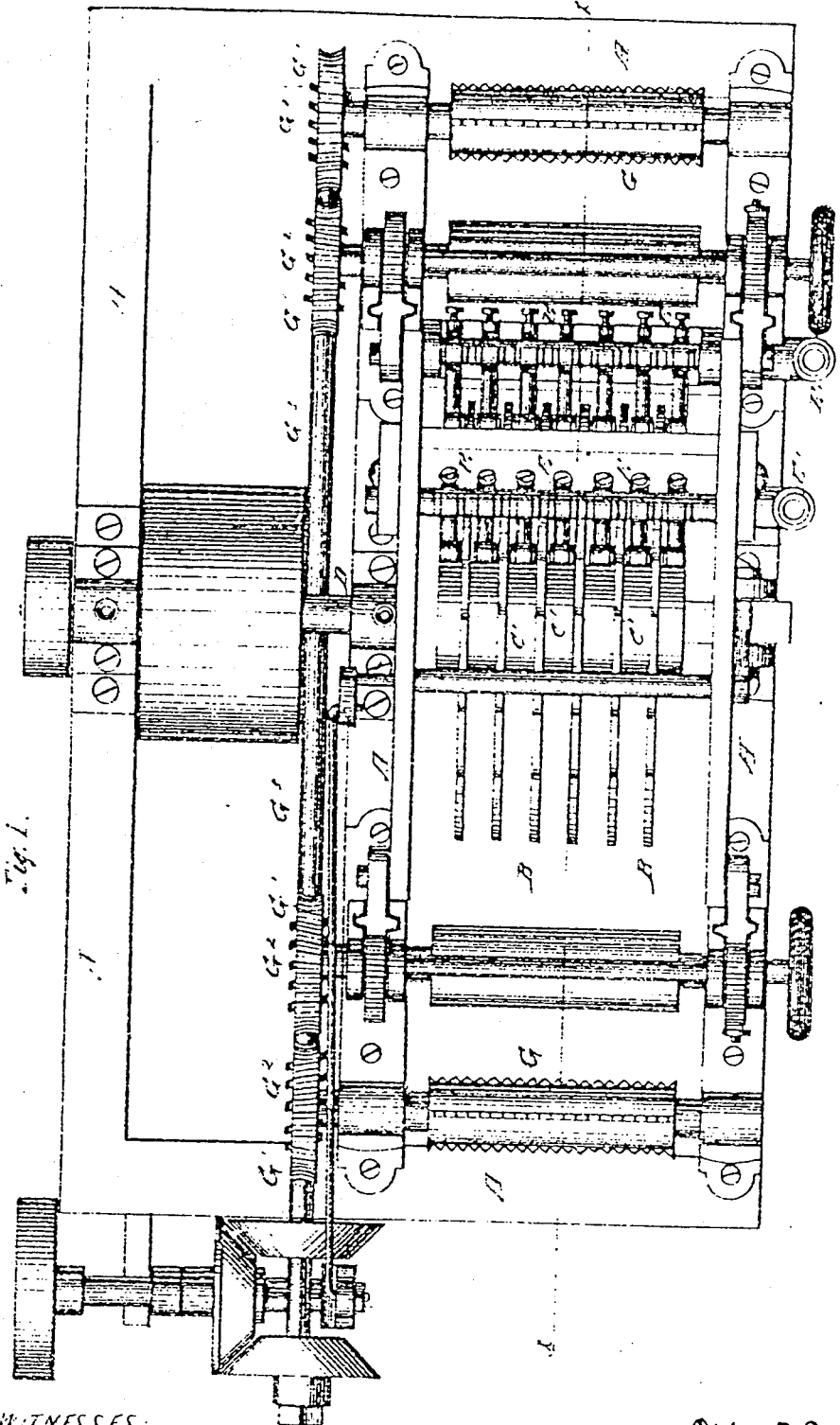
W. P. HALE.
Sawing-Machine.
No. 160,899. Patented March 16, 1875.

160,899. SAWING-MACHINES. William P. Hale, Brockport, N. Y., assignor to the Hale Manufacturing Company, Port Huron, Mich. [Filed Mar. 27, 1874.]

*To all whom it may concern:*

Be it known that I, WILLIAM P. HALE, of Brockport, in the county of Monroe and State of New York, have invented certain new and useful Improvements in Sawing-Machines; and I do hereby declare that the following is a full, clear, and exact description thereof, reference being had to the accompanying drawings, and to the letters of reference marked thereon, which form part of this specification.

My invention relates to that class of machines for sawing lumber in which a gang or series of circular saws are placed upon a revolving shaft or arbor for cutting a number of boards at one time; and the nature of my invention consists, first, in hanging the saws upon an open-ended cylinder, which is connected with the shaft or arbor by means of interior heads and set-screws; second, in a series of guides placed between the saws over the lumber being sawed; third, in constructing said guides hollow, and hanging them upon a hollow shaft, with communication between said shaft and guides, to allow oil to pass through and lubricate the leather upon the sides of the guides; fourth, in the means for driving the feed-rollers, all of which will be hereinafter more fully set forth.

In order to enable others skilled in the art to which my invention appertains to make and use the same, I will now proceed to describe its construction and operation, referring to the annexed drawings, in which—

Figure 1 is a plan view, Fig. 2 a central vertical section, and Fig. 3 a detail section, of arbor and saws.

A represents the frame of a sawing-machine, and B B are the saws therein. These saws are fitted or hung upon a cylinder, C, which is open at both ends, and connected to the central shaft or arbor D by means of heads $b\ b$ and set-screws $a\ a$. The heads $b\ b$ are fastened in any suitable manner on the shaft D, and the set-screws $a\ a$ are passed through the cylinder C into said heads. The heads are smaller than the interior of the cylinder, so as to leave a passage for a current of air through the cylinder, and cutting off the communication of heat from the journal or journals to the saws. The saws B B are fastened on the cylinder C by means of a series of rings, C' C', the outer one of which is screwed on the end of the cylinder, and holds the whole in place. Between the saws B B, over the lumber being sawed, are placed guides E E, which steady the saws immediately over the point where they enter and cut the lumber, and keep them in proper position, preventing any binding or twisting of the saws. The lower end of each guide E is bored out horizontally for the insertion of leather $d$, which projects on both sides of the guide, and against which the saws rub. The guides E E are hollow, and are attached on a hollow horizontal shaft, E', which has holes drilled at suitable intervals to communicate with the interior of the guides, and thus allow oil admitted into the hollow shaft E' to pass through to the leather $d$, and keep the same oiled at all times. Similar guides are arranged under the lumber where the saws emerge from the same. G G represent the feed-rollers, which may be constructed in any of the known and usual ways. The journals of the feed-rollers are extended upon one side of the machine, and are provided with worm-gear wheels $G^1\ G^1$, which mesh with worm-screws $G^2\ G^2$ upon a horizontal revolving shaft, $G^3$, whereby the rollers are rotated in a uniform and steady manner.

Having thus fully described my invention, what I claim as new, and desire to secure by Letters Patent, is—

1. As a means for lubricating saws, the hollow guides or projections E, furnished with leather or other suitable material, through which the oil is to exude or percolate.

2. In combination with the hollow guides or projections, a hollow shaft furnished with holes communicating with the interior of the guides, substantially as and for the purpose described.

In testimony that I claim the foregoing as my own I affix my signature in the presence of two witnesses.

WILLIAM P. HALE.

Witnesses:
   R. CHICKERING,
   JOHN ALLEN.